US 6,624,438 B2

(12) United States Patent
Koren

(10) Patent No.: US 6,624,438 B2
(45) Date of Patent: *Sep. 23, 2003

(54) SCANNING APPARATUS

(75) Inventor: Jacob Koren, Haifa (IL)

(73) Assignee: Orex Computed Radiography Ltd., Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 09/928,291

(22) Filed: Aug. 2, 2001

(65) Prior Publication Data

US 2002/0003219 A1 Jan. 10, 2002

Related U.S. Application Data

(63) Continuation-in-part of application No. 09/253,983, filed on Nov. 18, 1998, now Pat. No. 6,291,831.

(30) Foreign Application Priority Data

Nov. 20, 1997 (IL) .................................................. 122269

(51) Int. Cl.⁷ .............................................. G03B 42/00
(52) U.S. Cl. ........................ 250/584; 250/585; 250/586
(58) Field of Search ................................ 250/584, 585, 250/586, 484.4; 359/201, 212, 220; 358/493

(56) References Cited

U.S. PATENT DOCUMENTS

| 3,651,256 A | 3/1972 | Sherman et al. |
| 4,293,864 A | 10/1981 | Scott |
| 4,302,671 A | 11/1981 | Kato et al. |
| 4,543,479 A | 9/1985 | Kato |
| 4,582,989 A | 4/1986 | Agano |
| 4,595,957 A | 6/1986 | Holthusen |
| 4,631,407 A | 12/1986 | Kawajiri et al. |
| 4,692,813 A | 9/1987 | Conrad et al. |
| 4,816,923 A | 3/1989 | Saotome |
| 4,829,180 A | 5/1989 | Goto et al. |
| 4,882,488 A | 11/1989 | Hashiue |
| 4,886,968 A | 12/1989 | Ohnishi et al. |
| 4,973,134 A | 11/1990 | Finkenzeller et al. |
| 5,003,570 A | 3/1991 | Whiting |
| 5,047,643 A * | 9/1991 | Ogura ........................ 250/584 |
| 5,136,157 A | 8/1992 | Apter et al. |
| 5,365,562 A | 11/1994 | Toker |
| 5,396,081 A | 3/1995 | Ogura et al. |
| 5,635,728 A | 6/1997 | Cantu et al. |
| 5,874,744 A | 2/1999 | Goodman et al. |
| 5,900,640 A | 5/1999 | Ogura |
| 6,028,321 A * | 2/2000 | Rantanen ..................... 250/584 |
| 6,291,831 B1 * | 9/2001 | Koren ........................ 250/584 |
| 6,418,190 B1 | 7/2002 | Yokozawa et al. |

FOREIGN PATENT DOCUMENTS

| JP | 1-105935 A | 4/1989 |
| JP | 6019014 A2 | 1/1994 |
| WO | WO 94/27167 A1 | 11/1994 |

* cited by examiner

Primary Examiner—Scott J. Sugarman
Assistant Examiner—Richard Hanig
(74) Attorney, Agent, or Firm—Wolf, Greenfield & Sacks, P.C.

(57) ABSTRACT

A scanning apparatus is provided, which includes a medium attached to a surface of a fixed, hollow cylindrical segment, the fixed, hollow cylindrical segment having a first longitudinal axis, a rotational radial laser beam rotating around the first longitudinal axis and arranged to scan said medium, and a light sensitive detector having a light acceptance direction along a second axis coinciding with the first longitudinal axis of the cylindrical segment.

50 Claims, 8 Drawing Sheets

SCANNING APPARATUS

RELATED APPLICATIONS

This application is a Continuation-in Part Application of U.S. application Ser. No. 09/253,983, filed Nov. 18, 1998 now U.S. Pat. No. 6,271,831, which is incorporated herein by reference.

FIELD OF THE INVENTION

This invention relates generally to an axially oriented optical system and more particularly to a system using a radial rotating light beam for scanning a medium mounted on a fixed cylindrical member.

BACKGROUND OF THE INVENTION

Previously, scanners of X-ray exposed phosphor plates performed their function on a flat-bed or the external surface of a rotating drum. These systems have problems that increase the cost and reduce the quality of the X-ray image. The undesirable results obtained with a flat-bed or rotating drum system are caused by the continuous changing of the angles and distances of the light beam paths used for stimulating the phosphor of the X-ray exposed phosphor plates. Also, the collection of the stimulated light is performed with a different path and angle for each position on the phosphor plate, thereby requiring complicated, expensive compensation with a resultant reduction in quality. Additionally, the complications with attendant increases in cost are exacerbated when existing systems for supporting the phosphor plates do not maintain a fixed positioning during the scanning procedure.

Apparatus for radiation image read-out are known and are described, for example, in U.S. Pat. Nos. 4,886,968 and 5,396,081.

An optical system for an internal drum readout apparatus using a radial rotating light beam, which provides for minimizing distortion together with a reduction of cost and complexity cannot be found in the art.

Neither the prior art devices nor contemplated solutions for their deficiencies are capable of resulting in a digitizer apparatus providing a combination of reduction in cost with an increase in accuracy and quality.

SUMMARY OF THE INVENTION

In view of the aforementioned drawbacks of the conventional scanner systems, this invention provides a scanning system with a novel on-axis optical system to minimize distortion and avoid complex compensation introduced by currently used arrangements, while at the same time achieving cost reduction.

In addition, a light beam scanning system for digitizing X-ray exposed phosphor plates for storage and/or image display is provided.

There is thus provided, in accordance with a preferred embodiment of the present invention, a scanning apparatus, which includes a medium attached to a surface of a fixed, hollow cylindrical segment, the fixed, hollow cylindrical segment having a first longitudinal axis, a rotational radial laser beam rotating around the first longitudinal axis and arranged to scan said medium, and a light sensitive detector having a light acceptance direction along a second axis coinciding with the first longitudinal axis of the cylindrical segment.

Further, in accordance with a preferred embodiment of the present invention, the apparatus further includes at least one reflector for directing the beam towards the medium. The apparatus further includes transport apparatus for rotating and translating the laser beam.

Further, in accordance with a preferred embodiment of the present invention, the medium is a phosphor plate.

Further, in accordance with a preferred embodiment of the present invention, the reflecting unit may be a slanted mirror fixedly mounted for movement with the transport apparatus. A hole may be formed in the center of the slanted mirror for directing the laser beam therethrough. Furthermore, in accordance with a preferred embodiment of the present invention, the slanted mirror forms an angle in the range of 30–60 degrees relative to the longitudinal axis. The slanted mirror may be concave.

Further, in accordance with a preferred embodiment of the present invention, the apparatus further includes a rotating shaft, the laser beam being attached to the rotating shaft, wherein power is directed via slip rings attached to the rotating shaft.

Further, in accordance with a preferred embodiment of the present invention, the apparatus further includes a hollow shaft providing a beam path from the light source to the hole, and a mirror fixedly mounted in the hole for movement with the transport and rotated with the shaft for presentation of the beam along a radial from the axis to the medium.

Also, in accordance with a preferred embodiment of the present invention, the apparatus further includes a Fresnel lens mounted within the hollow cylindrical segment and proximate to the concave interior of the hollow cylindrical segment. The Fresnel lens has a longitudinal axis perpendicular to the longitudinal axis of the hollow cylindrical segment and the Fresnel lens has a hole formed in the center thereof to allow the beam and the receiving light emanating from the medium to pass through undisturbed.

Further, in accordance with a preferred embodiment of the present invention, the light emanating from the medium is refracted by the Fresnel lens the refracted light being reflected by the slanted mirror through the detector.

In addition, in accordance with a preferred embodiment of the present invention, there is also provided a scanning method. The method includes:

attaching a medium to a surface of a fixed, hollow cylindrical segment, having a first longitudinal axis;

arranging a rotational radial laser to rotate around the first longitudinal axis beam to scan the medium; and detecting the rays reflected from the medium along a second axis, said second axis coinciding with the first longitudinal axis.

These and other advantages, features and objects will become more apparent from the following description taken in connection with the illustrative embodiments in the accompanying drawings.

BRIEF DESCRIPTION OF THE DRAWINGS

An axially oriented optical system in accordance with the present invention will be described infra with respect to the accompanying drawings, which are not drawn to scale, of which.

DESCRIPTION OF EMBODIMENTS

Figure 1:
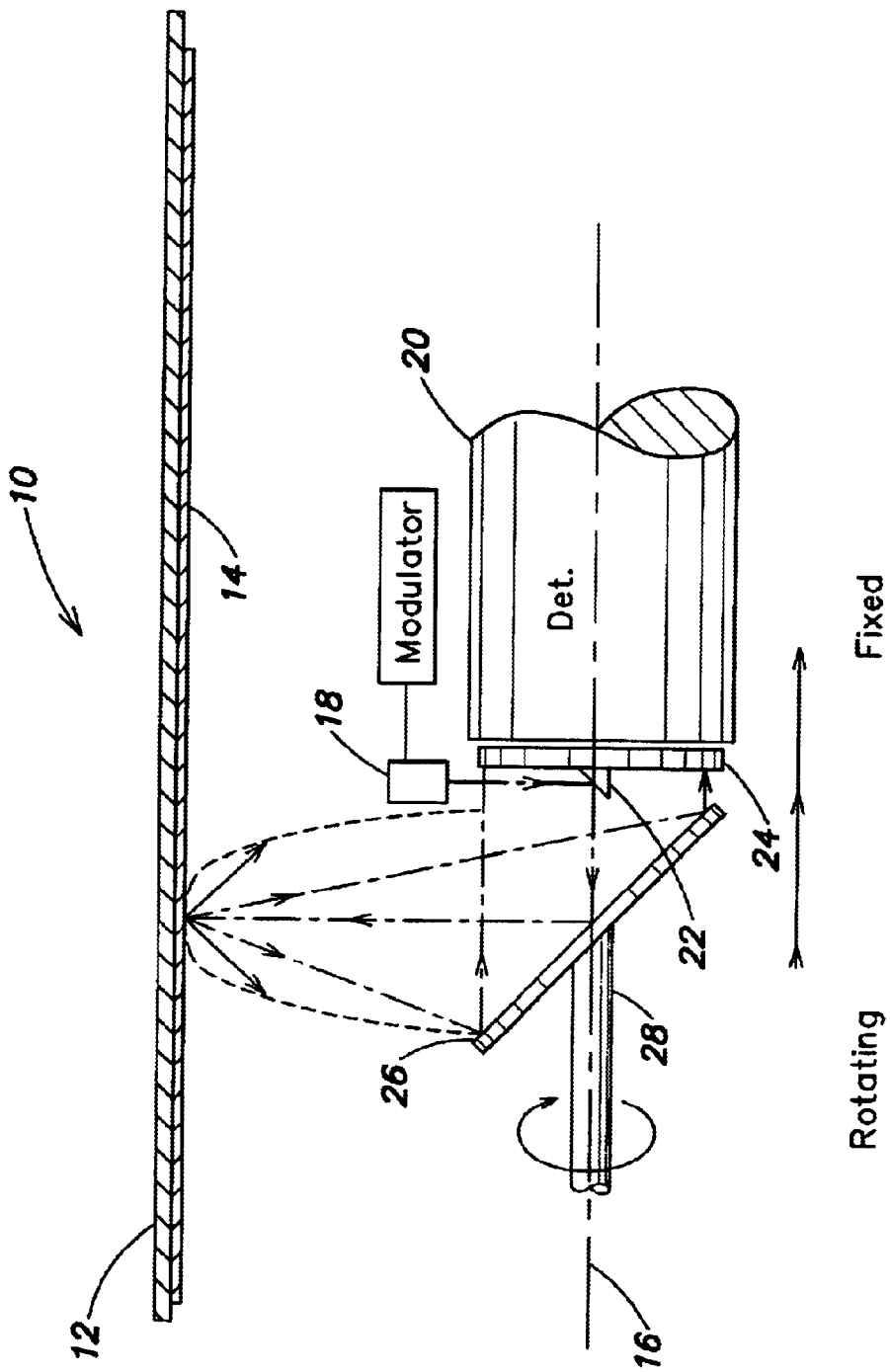
FIG. 1 is a schematic representation of one embodiment or arrangement of the optical system of this invention.

Reference is now made to FIG. 1, which illustrates an embodiment of the present invention in which a system for scanning a medium mounted on a fixed cylindrical member is shown. The scanning apparatus 10 comprises a hollow cylinder 12 on the internal face of which is mounted a scanning medium 14. The light beam for scanning is rotated, as will be described hereinbelow, against the fixed hollow cylinder 12.

FIG. 1 shows a portion or segment of hollow cylinder 12 for shaping a medium, such as a phosphor plate 14, on the internal face of the cylinder for a scanning procedure. The longitudinal, central axis 16 of the portion of the cylinder 12 forms the main axis of the optical system of the scanning apparatus 10. Thus, when the phosphor plate 14 is located against and conforms to the internal cylindrical shape of the hollow, cylinder segment 12, the axis of the phosphor plate 14 is collinear with axis 16. As is usual with apparatus of this type, the phosphor plate is required to be enclosed to eliminate light other than that required for its function. Since the enclosure is not part of the inventive concept of this invention, it is not shown in the interest of clarity.

The optical system of the scanning apparatus 10 includes a focused laser light source 18 having its peak wavelength at a suitable level (preferably approximately 635 nm) in order to stimulate the phosphor plate 14 and a light sensitive detector 20, for example, a photomultiplier tube for converting the stimulated light with a peak wavelength of 390 nm emitted from the phosphor plate 14 into electric signals. The laser beam is directed, as shown by the arrowed line, at a small mirror 22 located and affixed at the center of the detector 20, for example, by gluing it to a filter 24 of the Schott type that blocks the laser beam wavelength and allows only passage of the 390 nm stimulated light emitted from the phosphor plate 14. The small mirror 22 directs the laser light source beam 90 degrees along the axis 16 of the cylinder segment 12 to the center of a rotating mirror 26, whose rotation is about the axis 16, and is angled with respect to axis 16 to direct the laser beam along the radius from axis 16 to the phosphor plate 14 on the interior of cylinder 12. Of course, if small lasers were used, they could be mounted on the filter 24 in place of small mirror 22. The optimal angle of the rotating mirror 26 depends on the type of mirror being used. For example, for a flat rotating mirror shown in the embodiment of FIG. 1, having the dual function of reflecting both the stimulating light and stimulated light, the angle should be preferably be 45 degrees.

The light source 18, filter 24 with small mirror 22 and detector 20 remain fixed against rotation, while angled or slanted mirror 26 and its shaft 28 are rotated together. At the point of stimulation of the phosphor plate 14, the stimulated light at 390 nm is directed, as shown by the arrowed beam lines, back toward the slanted, rotating mirror 26 for passage through the filter 24 to the detector 20 for conversion to an electronic signal for digitalization, as will later be described.

The optical items 18 through 28 are to be moved in translation so that the beam from the light source traverses the fixed phosphor plate 14, for example, in the direction of the arrows below the figure while the focused beam either creates arcs of circles or, if desired, a helix during the traverse.

Figure 2:
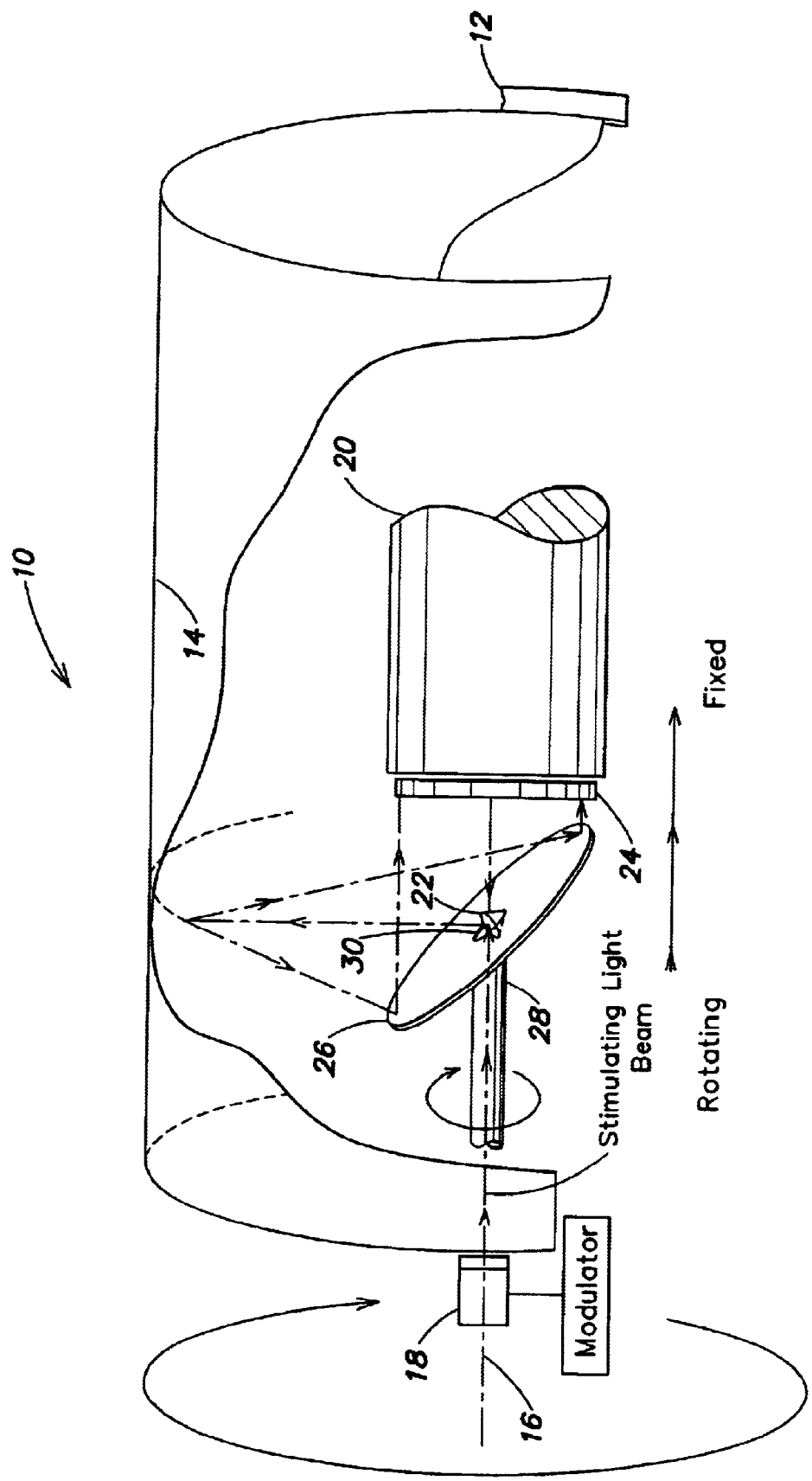
FIG. 2 is a schematic representation of an alternative arrangement of the optical system of this invention.

FIG. 2 illustrates a further embodiment of the present invention. FIG. 2 schematically represents an alternative arrangement whereby the light source 18 lies on axis 16 of shaft 28, which is collinear with the hollow cylinder portion 12, which forms the support for phosphor plate 14. In this application the shaft is hollow to allow the passage of the beam therethrough, and the angled rotating mirror 26 has a hole 30 at its center for allowing the passage of the beam to small mirror 22, which is mounted within the hole. Mirror 22 need not be the exact shape as illustrated. For example, it could be a penta prism or other optic arrangement that will perform the same result as the small mirror 22.

In this embodiment, the angle of the rotating mirror 26 may be adjusted to suit the type of mirror being used. For instance, if rotating mirror is flat, the mirror may be angled at any suitable angle depending on the size of the mirror and preferably is within the range of 30–60 degrees. Alternatively, rotating mirror 26 may be an alternative shape, such as concave.

Figure 3:
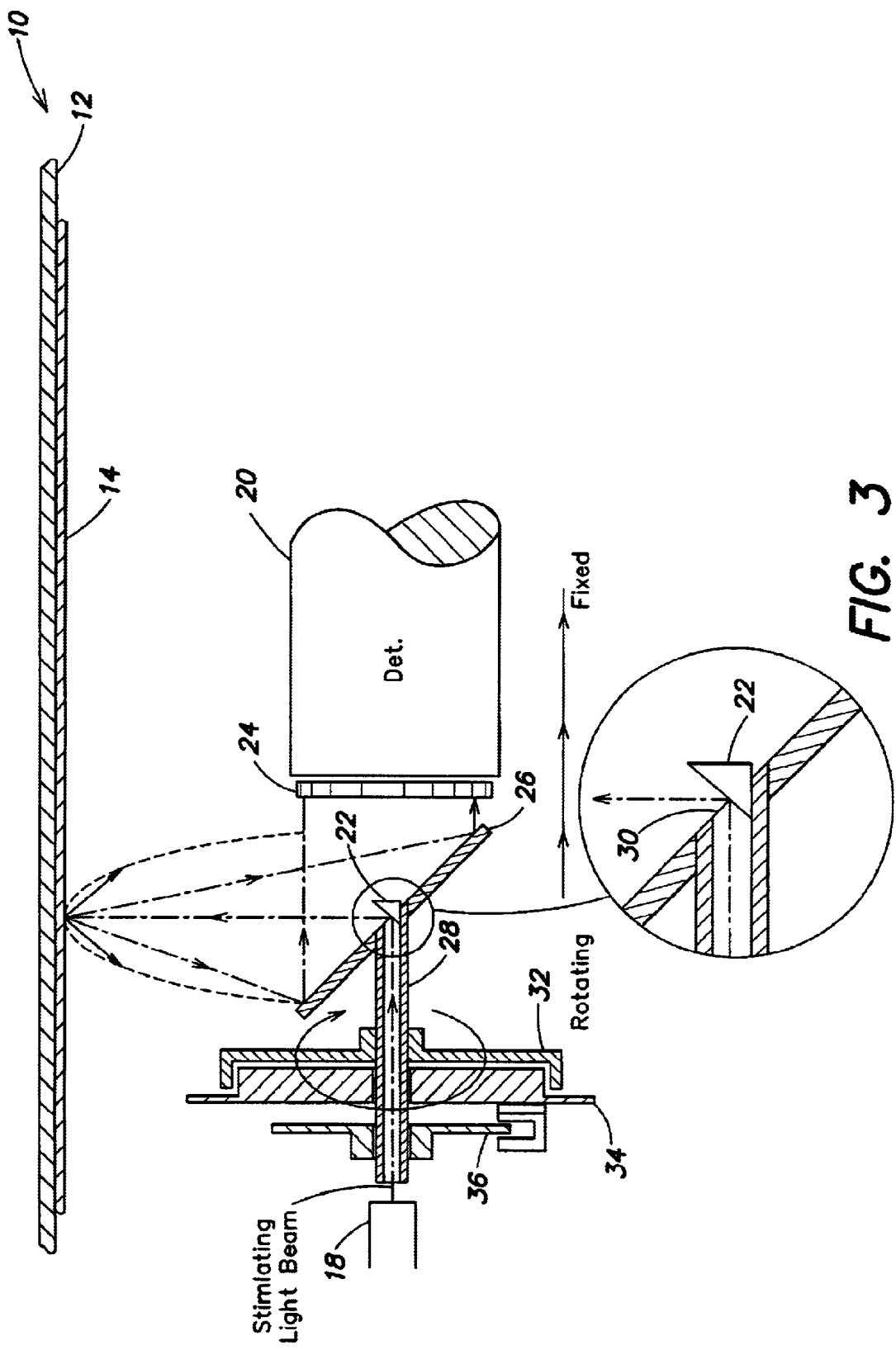
FIG. 3 is a schematic view of the embodiment of FIG. 2 with a rotative drive and encoding system that is applicable to all embodiments.

FIG. 3A illustrates the embodiment of FIG. 2 with the addition of a conventional motor mechanism comprising rotor 32, mounted for rotation with shaft 28, and a fixed stator 34. In the embodiments of FIGS. 1, 2 and 3 the filter 24 and detector 20 do not rotate. A conventional on-axis optical encoder system 36 is also mounted with respect to the motor for providing feedback pulses to stabilize rotation speed and for determining the beam positioning.

Reference is now made to FIG. 3B which illustrates a further embodiment of the present invention, which is similar to the embodiments of FIGS. 2 and 3A, except that mirror 26 is omitted. In this embodiment, the beam passes through the hollow shaft 28 to the small mirror 22, which is mounted, as shown in FIG. 3A, at the end of the chamfered hollow shaft. The beam is reflected (B1) at right angles towards the scanning medium 14. Some of the stimulated light, illustrated by the angle between beams B2 and B3, is directed back towards the detector 20 (via filter 24). By altering the size of the detector the amount of collected light may be varied.

In a further alternative embodiment, at least one reflector may be optionally added, as illustrated, for exemplary purposes only, by curved reflectors 152. As will be appreciated by persons knowledgeable in the art, the shape, size and number of reflectors may be altered so as to direct the desired pre-determined amount of light towards detector 20.

Figures 4A, 4B:
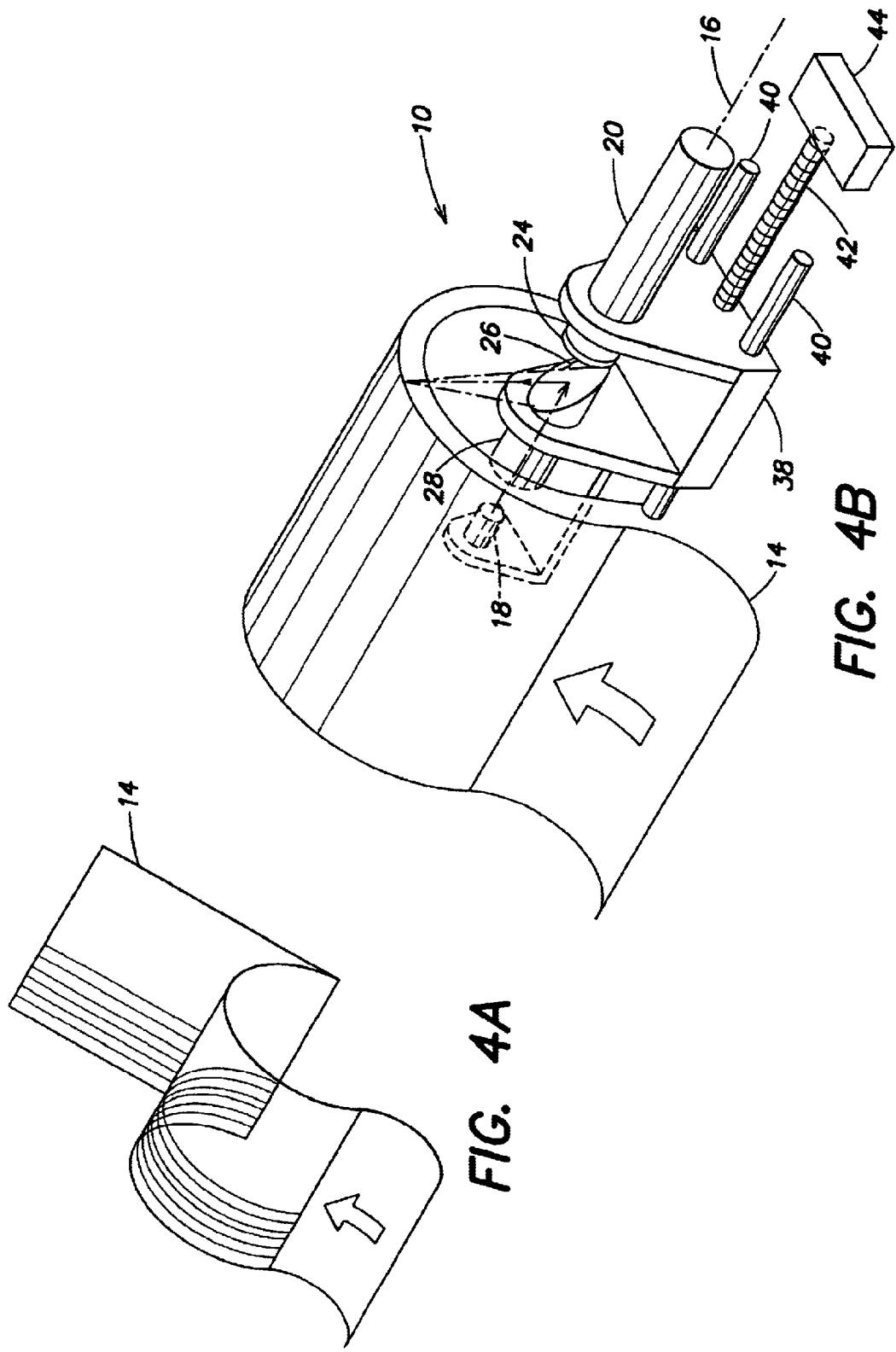
FIGS. 4A and 4B are schematic representations of a phosphor plate or film with a representation of the scan pattern thereon and a representation of a system for axial movement of the optical system, respectively.

FIGS. 4A and 4B are illustrations of a phosphor plate film 14 and the mechanism for traversing the film, respectively, during scanning whereby the rotation of the optical system 10 produces a scan path indicated by the parallel lines of FIG. 4A.

It is an advantage of the present invention that by using a fixed cylinder, the scanning medium can be mechanically fed, in contrast to scanning systems using rotating drums which require the manual attachment of the scanning medium to the face of the drum.

FIG. 4A additionally utilizes the parallel lines for depicting a chosen distance, in this case 100 micron spacing, from the previous scan. FIG. 4B illustrates the film 14 of FIG. 4A in its position in the apparatus with the hollow, cylindrical portion 12 removed for clarity. The parallel lines of the film 14 in FIG. 4B are illustrative only of the cylindrical shape of the film 14 when it is within the cylinder 12.

Schematically illustrated in FIG. 4B is the means for effecting the axial path spacing of the optical system as disclosed in FIGS. 2 and 3. A support structure or transport 38, as seen in FIG. 4B is provided with bearings, not shown, for those parts of the optical system 10, which are required to be rotated, as is conventional in the field of mechanical design. The means for movement of the optical system of this invention along its axis 16 can be selected from a variety of options, only one of which is illustrated. The support structure 38 has a pair of rods 40 for stabilization, guidance and maintenance of direction of the transport 38 in a straight line. A threaded member 42, fixed with respect to any axial movement, is engaged with mating threads in the support structure 38 for its axial movement in order to obtain the traversing for scanning of the focused spot with respect to the film 14. A linear stepping motor 44, schematically shown, provides the rotation of the threaded member to accurately space the separate scans across film 14. Although the light source 18 is only schematically depicted, it is shown as attached to the support structure 38.

Figure 5:
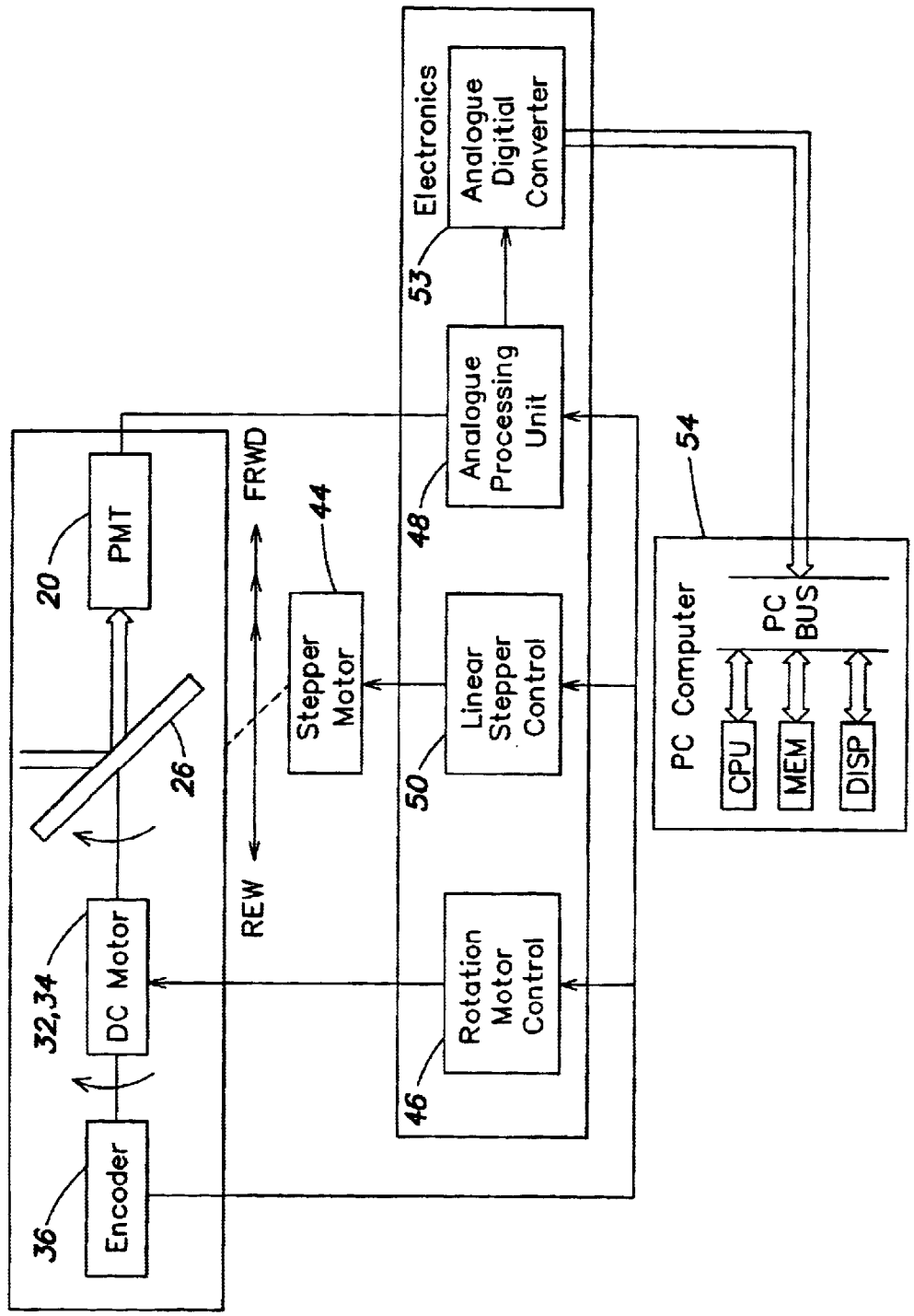
FIG. 5 is a block diagram of the control system for the operation of the optical system of this invention.

FIG. 5 is a block diagram illustrating the control of the apparatus thus far described. The DC motor 32, 34 the encoder 36 and the 45 degree angled mirror 26 are connected for simultaneous rotary operation as shown in FIG. 3, since they all are on the same shaft 28. The DC motor has a rotation motor control 46, which in turn is connected for cooperation with encoder 36. The stepper motor 44 of FIG. 4B has a linear stepper control 50, which is also connected with the output from encoder 36. The output from the detector, photomultiplier (PMT) 20 and that of encoder 36 provide input to the analog processing unit 48, which provides its output to an analog to digital converter 52 for connection with a PC computer 54.

Operation

Operation of the apparatus of this invention as a readout device involves the presentation of an X-ray exposed phosphor plate or film 14 to the interior of a fixed portion of a hollow cylinder 12 to which the phosphor plate is pressed firmly to conform to the circular configuration of the cylindrical portion without any motion ensuing while the scanning or reading is being effected. Apparatus for this purpose is well known.

The scanning operation involves the mounting of a light source such as a 635 nm laser 18 and a spinning mirror surface 26 that is angled at a suitable angle (depending on the type of rotating mirror used, as described hereinabove with respect to FIGS. 1–4) with respect to its axis of rotation 16, which is collinear with the central axis of the film 14 and its support 12. In order to bend the light beam 90 degrees and to rotate it with the mirror, the beam has to be reflected from the center of rotation of the mirror 26. The beam then forms a rotating spot on the film that follows a path of a portion of a circle on the phosphor plate 14. When the laser beam starts from between the rotating mirror 26 and the filter 24, no hole in the rotating mirror 26 is required. Whereas the laser 18, when it is behind the rotating mirror 26, requires a hole in its center with a small mirror 22 therein to supply the directing of the beam perpendicular to a spot on the film.

The support structure or transport 38 contains an optical system which includes light source 18, spinning mirror 26 and small mirror 22, when required, and its movement to traverse the phosphor plate 14 is coordinated with the rotative movement of the spot such that, when the spot reaches the end of the film 14, the cart then moves the distance of one pixel for the next scan. The spot is chosen to be, for example, 100 micron in diameter thereby forming a circular line 100 micron wide; therefore the transport 38 moves the optic system a distance of 100 micron for the next scan.

More specifically as a readout device, using phosphor plates, the following operation is effected.

Readout of a previously X-ray exposed phosphor plate is obtained by the 635 nm laser 18 stimulating the crystal layer of the phosphor plate causing it to radiate light at 390 nm as the beam spot on the film makes its scan. The rotating mirror 26 receive the emitted light around its outer periphery for reflection onto the Schott type filter 24 which is transparent to 390 nm while absorbing 635 nm light. The light passing through filter 24 is applied to detector photomultiplier tube 20, which converts the light to an electric signal that is amplified, gated to represent one pixel on the circular scan and converted to a digital number representing the brightness of the pixel. The filter 24 and detector 20 are also mounted on the transport 38.

The encoder 36 stabilizes the motor 32, 34 by feed back pulses which also control the gating of the output of the detector photomultiplier 20 to define time samples equivalent to 100 micro-meters in distance. The pulses are also used for defining, at any point in time during the scan, the angular position of rotating mirror 26 and the angle of the stimulated emission from the phosphor plate in order to activate the stepper motor for the next parallel scan. If a helical scan is required, the change would be within the skill of an ordinary technician.

Since the paths of the stimulating light and the stimulated light for all points are identical, and since the hitting and emitting angles for all scan points are perpendicular and identical, and since the scanning speed is constant and easy to maintain, there is no need for correction algorithms or compensation. Digitization resulting from the scanning action results in the ability to replicate and/or store the data from the film.

Although the invention has been illustrated in the accompanying drawings and described in the foregoing specification in terms of preferred embodiments, the invention is not limited to these embodiments. It will be apparent to those skilled in this art that certain changes, modifications and substitutions can be made without departing from the true spirit and scope of the appended claims. For example, the laser light source 18 could be mounted on the filter 24 thereby eliminating the need for small mirror 22. Furthermore, the teachings of this invention are applicable to other than a phosphor plate medium.

Figure 6:
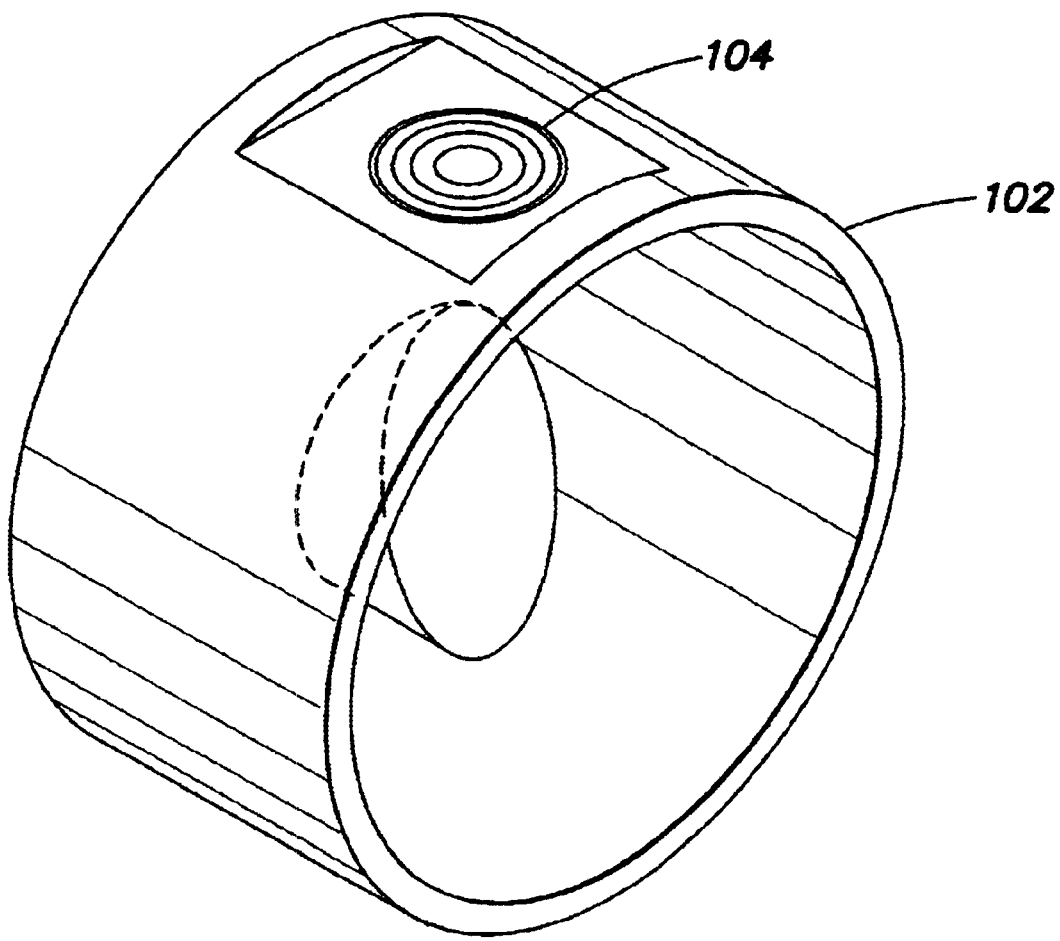
FIG. 6 is an isometric view of the optical system of a scanning apparatus constructed and operative in accordance with a further embodiment of the invention.
Figure 7:
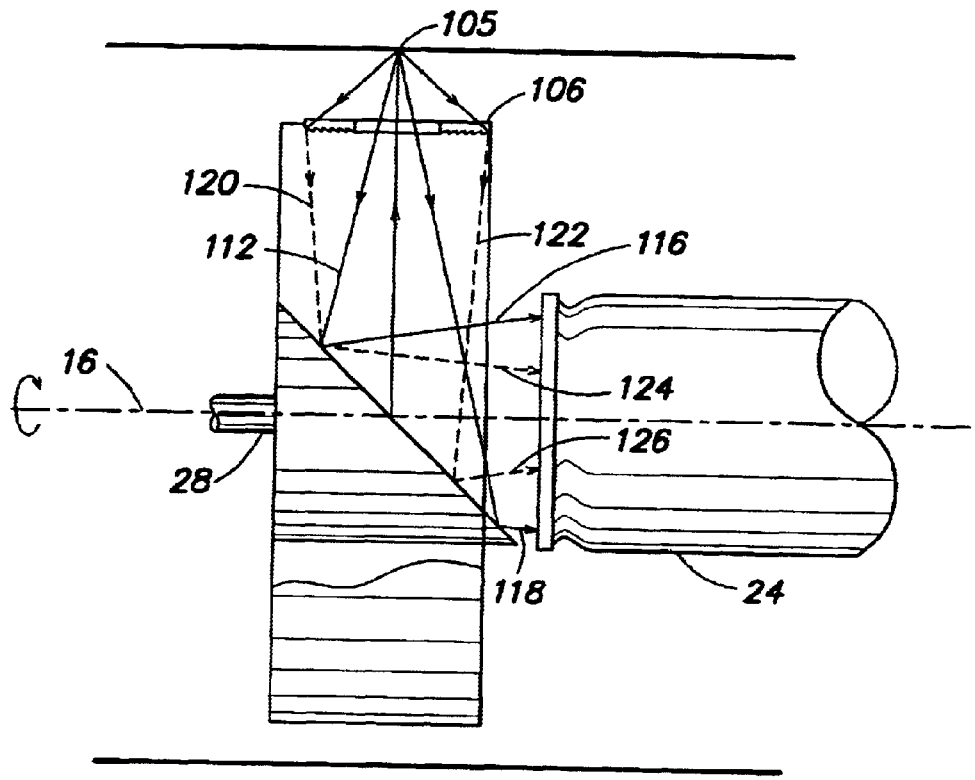
FIG. 7 is a schematic representation of the arrangement of the optical system of FIG. 6.
Figure 8:
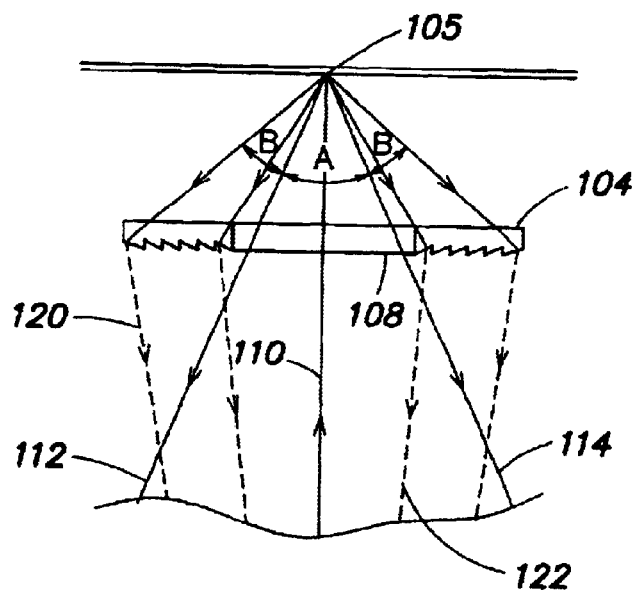
FIG. 8 is a detailed schematic representation of the Fresnel lens arrangement used in the embodiment of FIG. 6 and FIG. 9 which is a schematic representation of an alternative arrangement of the optical system of this invention.

Reference is now made to FIGS. 6–8 which illustrate a further embodiment of the scanning apparatus, generally designated 100, constructed and operative in accordance therewith. FIG. 6 shows a portion or segment of a hollow cylinder 102 (similar to hollow cylinder 12 described hereinabove). FIG. 7 is a schematic representation of the arrangement of the optical system 100 and FIG. 8 is a detailed representation of the optical arrangement.

The optical system 100 is similar to the optical system of scanning apparatus 10 described hereinabove with respect to FIGS. 1–5. Elements having similar functions as previous embodiments are similarly designated and will not be further described.

The optical system 100 comprises a hollow cylinder 102 for shaping the phosphor plate medium 14 (or similar) to be scanned on the internal face of the cylinder and the optical system shown in FIG. 3. The optical system includes a light source 18 which lies on the axis 16 of a hollow shaft 28. The hollow shaft, which is collinear with the hollow cylinder portion 102, allows the beam to pass through. The angled mirror 26 has a hole 30 at its center with a small mirror 22 mounted within the hole.

In addition, optical system 100 further comprises a Fresnel lens 104, which is inserted on the coaxial cylinder 102, as shown in FIG. 8. The cylinder 102 is connected to the slanted mirror system and rotates with it. The Fresnel lens 104 is placed on the cylinder so that its longitudinal axis 106 is parallel with the central axis 16 of the laser beam.

As previously described with respect to the embodiments of FIGS. 1–5 (that is without the Fresnel lens 104), the light collection is based on a cone of stimulated light with its source at the impinging point 105 of the laser. The base of the cone is defined by the angled mirror 26 which is reflected into the detector photomultiplier (PMT) tube 20. Alternatively, the stimulated light may be directly aimed to the PMT tube 20

In order to not obstruct the beam of light and prevent distortions, a hole 108 is drilled through the center of the Fresnel lens 104. The diameter of the hole 108 is configured so as to allow the same amount of stimulated light to pass through to the mirror and PMT as the previously described embodiments not having a lens, that is the lens 104 does not obstruct the passage of any light. As best seen in FIG. 7, the impinging ray 110 is returned as rays 112 and 114, which are reflected by mirror 26 as rays 116 and 118, respectively, through filter 24 into PMT 20.

The addition of the Fresnel lens 104 expands the angle of the cone from the impinging point 105 to the rim of the Fresnel lens 104. As best seen in FIG. 8, the angle of stimulated light is increased from "A" to "A+2B". Thus, additional rays, such 120 and 122, are refracted through the rim of the Fresnel lens 104 and then reflected by mirror 26 as rays 124 and 126, respectively, through filter 24 into PMT 20.

Thus, in this embodiment, an additional amount of light enters the PMT 20, the amount of light being proportional to the expanded angle ("A+2B"). The Fresnel lens 104 concentrates (or bends) the light reflected into its "ring" to the mirror. In other words, the addition of the Fresnel lens 104 allows an increased amount (2B) of light to be collected thereby improving the light collection efficiency of the system.

It will be appreciated that the invention is not limited to the use of a Fresnel lens but may be used with any other type of light collecting device.

Figure 9:
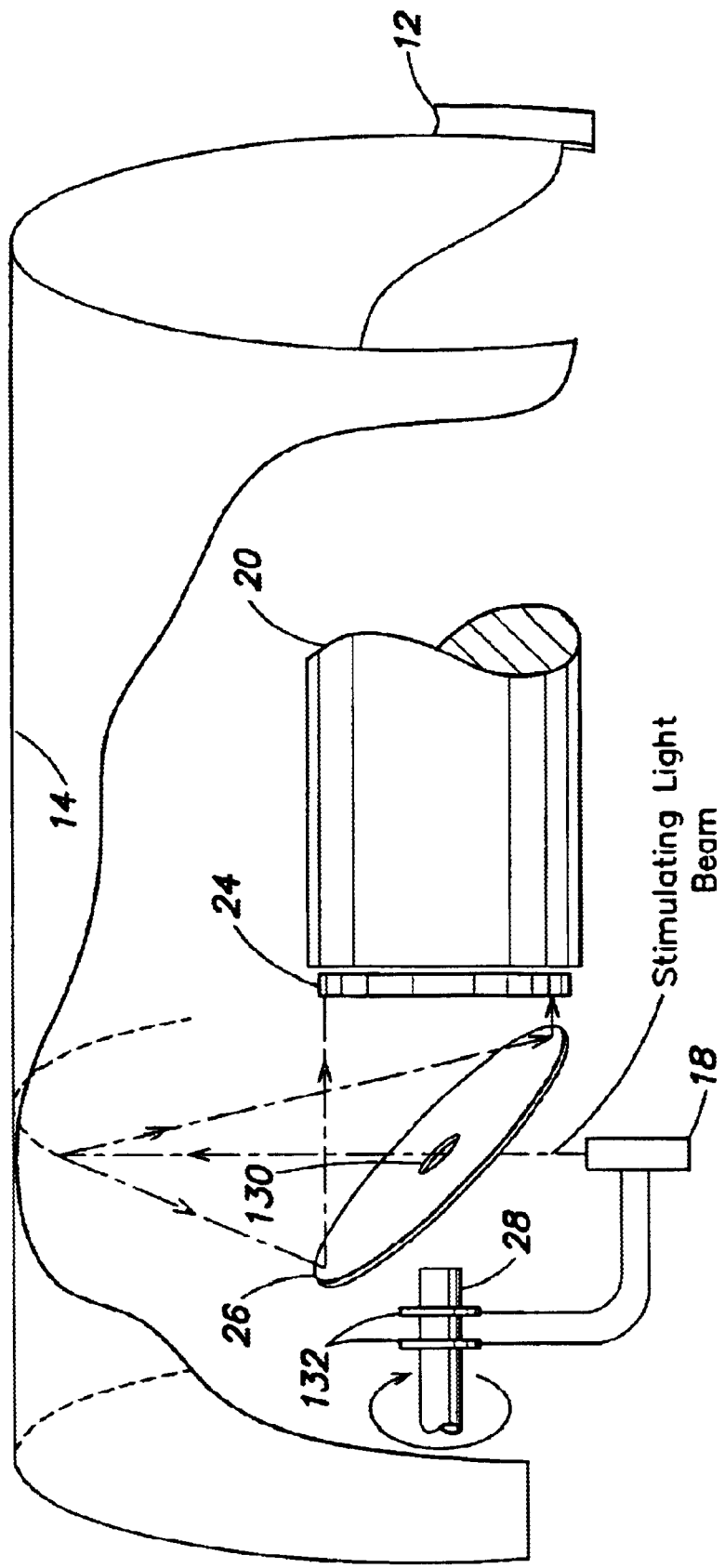

Reference is now made to FIG. 9, which is a schematic representation of a further embodiment of the present invention. This embodiment is similar to the embodiment of FIG. 2. Elements having similar functions as previous embodiments are similarly designated and will not be further described.

In the embodiment of FIG. 9, the laser source is attached to the rotating shaft 28 via slip rings 132 (known in the art) enabling power to be fed to the light source (modulator) 18. The laser beam is then directed through the hole 130 in mirror 26. The rays are reflected through filter 24 into PMT 20.

It will be further appreciated that the present invention is not limited by what has been described hereinabove and that numerous modifications, all of which fall within the scope of the present invention, exist. Rather the scope of the invention is defined by the claims, which follow:

What is claimed is:

1. A scanning apparatus comprising:
    a medium attached to a surface of a fixed, hollow cylindrical segment, said fixed, hollow cylindrical segment having a first longitudinal axis;
    at least one device configured to provide a rotational radial laser beam arranged to scan said medium, said rotational radial laser beam rotating around said first longitudinal axis; and
    a light sensitive detector having a light acceptance direction along at least a second axis, said second axis coinciding with said first longitudinal axis.

2. The apparatus according to claim 1, further comprising at least one reflecting unit for directing said beam towards said medium.

3. The apparatus according to claim 1, further comprising transport apparatus for rotating and translating said laser beam.

4. The apparatus according to claim 1, wherein said medium is a phosphor plate.

5. The apparatus according to claim 2, wherein said at least one reflecting unit is a slanted mirror fixedly mounted for movement with said transport apparatus.

6. The apparatus according to claim 5, further including a hole formed in the center of said slanted mirror for directing said laser beam therethrough.

7. The apparatus according to claim 5, wherein said slanted mirror forms an angle in the range of 30–60 degrees relative to said first longitudinal axis.

8. The apparatus according to claim 5, wherein said slanted mirror is concave.

9. The apparatus according to claim 6, further comprising a rotating shaft, said laser source being attached to said rotating shaft, wherein power is directed via slip rings attached to said rotating shaft.

10. The apparatus according to claim 6, further comprising a hollow shaft providing a beam path from said light source to said hole, and a mirror fixedly mounted in said hole for movement with said transport and rotated with said shaft for presentation of said beam along a radial from said axis to said medium.

11. The apparatus according to claim 1, further comprising a Fresnel lens mounted within said hollow cylindrical segment and proximate to the concave interior of said hollow cylindrical segment, said Fresnel lens having a longitudinal axis perpendicular to the longitudinal axis of said hollow cylindrical segment and said Fresnel lens having a hole formed in the center thereof to allow said beam and said receiving light emanating from the medium to pass through undisturbed.

12. The apparatus according to claim 11, wherein the light emanating from said medium is refracted by said Fresnel lens said refracted light being reflected by said slanted mirror through said detector.

13. A scanning method comprising:
    attaching a medium to a surface of a fixed, hollow cylindrical segment, said fixed, hollow cylindrical segment having a first longitudinal axis;
    arranging a rotational radial laser beam to rotate around said first longitudinal axis to scan said medium; and
    detecting at least some rays emitted from said medium in response to the rotational radial laser beam and traveling along a direction at least approximately parallel to a second axis, said second axis coinciding with said first longitudinal axis.

14. The method according to claim 13, further comprising directing said beam towards said medium.

15. The method according to claim 13, further comprising rotating and translating said laser beam.

16. The method according to claim 15, wherein said directing comprises reflecting said beam via a slanted mirror mounted on said transport apparatus.

17. The method according to claim 16, further comprising forming a hole in the center of said slanted mirror for directing said laser beam therethrough.

18. The method according to claim 17, further comprising attaching said laser source to said rotating shaft and directing power via slip rings attached to said rotating shaft.

19. The scanning apparatus of claim 1, further comprising:
 a first component to reflect first radiation provided along at least a portion of the first longitudinal axis off the first longitudinal axis to provide the rotational radial laser beam; and
 a second component to reflect second radiation emitted from the medium in response to the rotational radial laser beam.

20. The scanning apparatus of claim 19, wherein the first radiation travels along at least the portion of the first longitudinal axis in a direction away from the light sensitive detector.

21. The scanning apparatus of claim 19, wherein the first radiation travels along at least the portion of the first longitudinal axis in a direction towards the light sensitive detector.

22. The scanning apparatus of claim 19, wherein the first component includes a reflective surface rotatable about the first longitudinal axis.

23. The scanning apparatus of claim 19, wherein the second component includes at least one reflective surface arranged to receive the second radiation directly from the medium.

24. The scanning apparatus of claim 19, wherein the second component includes at least one reflective surface arranged to reflect the second radiation such that at least some of the second radiation travels non-parallel to the first longitudinal axis toward the light sensitive detector.

25. The scanning apparatus of claim 19, wherein the second component includes at least one reflective surface arranged to reflect the second radiation toward the light sensitive detector such that at least some of the second radiation has a significant vector component parallel to the first longitudinal axis.

26. The scanning apparatus of claim 19, wherein the first component includes at least one first reflective surface having a first normal and the second component includes at least one second reflective surface having at least one second normal different from the first normal.

27. The scanning apparatus of claim 19, wherein the light sensitive detector is oriented to facilitate detection of radiation traveling non-parallel to the first longitudinal axis.

28. The scanning apparatus of claim 27, wherein the second component includes at least one reflective surface arranged to reflect the second radiation such that at least some of the second radiation travels non-parallel to the first longitudinal axis toward the light sensitive detector.

29. The scanning apparatus of claim 19, wherein the light sensitive detector is oriented to facilitate detection of radiation having a significant vector component parallel to the first longitudinal axis.

30. The scanning apparatus of claim 29, wherein the second component includes at least one reflective surface arranged to reflect the second radiation toward the light sensitive detector such that at least some of the second radiation has a significant vector component parallel to the first longitudinal axis.

31. The scanning apparatus of claim 29, wherein the light sensitive detector includes a detection surface essentially perpendicular to the first longitudinal axis.

32. The scanning apparatus of claim 29, wherein the first longitudinal axis passes through a center of the light sensitive detector.

33. The scanning apparatus of claim 1, wherein the light sensitive detector is oriented to facilitate detection of radiation traveling non-parallel to the first longitudinal axis.

34. The scanning apparatus of claim 1, wherein the light sensitive detector is oriented to facilitate detection of radiation having a significant vector component parallel to the first longitudinal axis.

35. The scanning apparatus of claim 34, wherein the light sensitive detector includes a detection surface essentially perpendicular to the first longitudinal axis.

36. The scanning apparatus of claim 34, wherein the first longitudinal axis passes through a center of the light sensitive detector.

37. The method of claim 13, further comprising acts of:
 reflecting first radiation from a first surface, the first radiation provided along at least a portion of the first longitudinal axis and reflected off the first longitudinal axis by the first surface to provide the rotational radial laser beam; and
 reflecting second radiation from a second surface to provide the at least some rays.

38. The method of claim 37, further comprising an act of providing a light sensitive detector to detect the at last some rays emitted from said medium, wherein the act of reflecting first radiation includes an act of reflecting first radiation traveling along at least the portion of the first longitudinal axis in a direction away from the light sensitive detector.

39. The method of claim 37, further comprising an act of providing a light sensitive detector to detect the at least some rays emitted from said medium, wherein the act of reflecting first radiation includes an act of reflecting first radiation traveling along at least the portion of the first longitudinal axis in a direction towards the light sensitive detector.

40. The method of claim 37, wherein the act of reflecting first radiation includes rotating the first surface about the first longitudinal axis.

41. The method of claim 37, wherein the act of reflecting second radiation includes an act of directly receiving at the second surface the second radiation emitted from the medium.

42. The method of claim 37, wherein the act of reflecting second radiation includes an act of reflecting the second radiation such that at least some rays travel non-parallel to the first longitudinal axis.

43. The method of claim 37, wherein the act of reflecting second radiation includes an act of reflecting the second radiation such that at least some rays have a significant vector component parallel to the first longitudinal axis.

44. The method of claim 37, wherein the act of reflecting first radiation includes an act of reflecting first radiation from a first surface having a first normal and the act of reflecting second radiation includes an act of reflecting second radiation from a second surface having at least one second normal different from the first normal.

45. The method of claim 37, wherein the act of detecting at least some rays includes an act of detecting at least some rays emitted from the medium traveling non-parallel to the first longitudinal axis.

46. The method of claim 37, wherein the act of detecting at least some rays includes an act of detecting at least some rays emitted from the medium having a significant vector component parallel to the first longitudinal axis.

47. The method of claim 46, wherein the act of detecting at least some rays includes an act of detecting at least some rays emitted from the medium traveling essentially parallel to the first longitudinal axis.

48. The method of claim 13, wherein the act of detecting at least some rays includes an act of detecting at least some rays traveling non-parallel to the first longitudinal axis.

49. The method of claim 13, wherein the act of detecting at least some rays includes an act of detecting at least some rays having a significant vector component parallel to the first longitudinal axis.

50. The method of claim 49, wherein the act of detecting at least some rays includes an act of detecting at least some rays traveling essentially parallel to the first longitudinal axis.

* * * * *

UNITED STATES PATENT AND TRADEMARK OFFICE
CERTIFICATE OF CORRECTION

PATENT NO.   : 6,624,438 B2
DATED        : September 23, 2003
INVENTOR(S)  : Jacob Koren It is certified that error appears in the above-identified patent and that said Letters Patent is hereby corrected as shown below:

Column 10,
Line 35, please replace "last" with -- least --.

Signed and Sealed this

Eleventh Day of November, 2003

JAMES E. ROGAN
*Director of the United States Patent and Trademark Office*